US007986817B2

(12) United States Patent
Asano

(10) Patent No.: US 7,986,817 B2
(45) Date of Patent: Jul. 26, 2011

(54) VERIFICATION APPARATUS, VERIFICATION METHOD AND VERIFICATION PROGRAM

(75) Inventor: Tomoyuki Asano, Kanagawa (JP)

(73) Assignee: Sony Corporation, Tokyo (JP)

(*) Notice: Subject to any disclaimer, the term of this patent is extended or adjusted under 35 U.S.C. 154(b) by 908 days.

(21) Appl. No.: 11/926,553

(22) Filed: Oct. 29, 2007

(65) Prior Publication Data

US 2008/0183707 A1 Jul. 31, 2008

(30) Foreign Application Priority Data

Nov. 20, 2006 (JP) .............................. P2006-313211

(51) Int. Cl.
*G06K 9/00* (2006.01)

(52) U.S. Cl. ...... 382/115; 382/124; 340/5.52; 340/5.53; 340/5.82; 340/5.83

(58) Field of Classification Search ................. 382/115, 382/124; 340/5.52, 5.53, 5.82, 5.83
See application file for complete search history.

(56) References Cited

U.S. PATENT DOCUMENTS

2002/0048390 A1* 4/2002 Ikegami ........................ 382/124
2006/0018515 A1 1/2006 Itoh et al.
2006/0165262 A1* 7/2006 Genda ........................ 382/115
2007/0041620 A1* 2/2007 Ito ................................ 382/115

FOREIGN PATENT DOCUMENTS

JP 2006-18676 1/2006

* cited by examiner

*Primary Examiner* — Jon Chang
(74) *Attorney, Agent, or Firm* — Finnegan, Henderson, Farabow, Garrett & Dunner, L.L.P.

(57) ABSTRACT

A verification apparatus for checking a verification-target data against registrant's identification data, including: a storage section that stores a plurality of first checkup order data each of which defines an order of checking the verification-target data against a plurality of registrant's identification data that are divided in accordance with a predetermined condition into a plurality of first groups; a selection section that selects one of the first checkup order data that is associated with a first group corresponding to the condition; and a checkup section that checks, in accordance with the selected first checkup order data, the verification-target data against a plurality of registrant's identification data in the first group corresponding to the condition.

11 Claims, 11 Drawing Sheets

DB

| DATA ID | REGISTRANTS' IMAGE DATA FILE NAME |
|---|---|
| A0001 | REGISTRANT' S IMAGE DF-A0001 |
| A0002 | REGISTRANT' S IMAGE DF-A0002 |
| A0003 | REGISTRANT' S IMAGE DF-A0003 |
| A0004 | REGISTRANT' S IMAGE DF-A0004 |
| A0005 | REGISTRANT' S IMAGE DF-A0005 |
| A0006 | REGISTRANT' S IMAGE DF-A0006 |
| A0007 | REGISTRANT' S IMAGE DF-A0007 |
| ⋮ | |
| AM | REGISTRANT' S IMAGE DF-AM |
| B0001 | REGISTRANT' S IMAGE DF-B0001 |
| ⋮ | |
| BN | REGISTRANT' S IMAGE DF-BN |

FIG. 4

GL REGIONAL GROUP MANAGEMENT LIST

| REGIONAL GROUP NAME | MACHINE ID |
|---|---|
| TK HEADQUARTER | 3Ta |
| TK HEADQUARTER | 3Tb |
| TK HEADQUARTER | 3Tc |
| YH REGIONAL OFFICE | 3Ya |
| YH REGIONAL OFFICE | 3Yb |
| NG REGIONAL OFFICE | 3Na |
| OS REGIONAL OFFICE | 3Oa |
| OS REGIONAL OFFICE | 3Ob |

FIG. 5

LL DISTANCE LIST

UNIT [km]

| REFERENCE REGION G | TK HEADQUARTER | YH REGIONAL OFFICE | NG REGIONAL OFFICE | OS REGIONAL OFFICE |
|---|---|---|---|---|
| TK HEADQUARTER | 0 | 100 | 400 | 600 |
| YH REGIONAL OFFICE | 100 | 0 | 300 | 500 |
| NG REGIONAL OFFICE | 400 | 300 | 0 | 200 |
| OS REGIONAL OFFICE | 600 | 500 | 200 | 0 |

FIG. 7

| CHECKUP ORDER | DATA ID | AUTHENTICATION FREQUENCY VALUE |
|---|---|---|
| 1 | AΔΔΔΔ | ×××× |
| 2 | AΔΔΔΔ | ×××× |
| 3 | AΔΔΔΔ | ×××× |
| 4 | AΔΔΔΔ | ×××× |

⋮

FIG. 11A

UL

| REFERENCE REGION G | TK HEADQUARTER | YH REGIONAL OFFICE | NG REGIONAL OFFICE | OS REGIONAL OFFICE |
|---|---|---|---|---|
| TK HEADQUARTER | 5 | 3 | 0 | 0 |
| YH REGIONAL OFFICE | 3 | 5 | 1 | 0 |
| NG REGIONAL OFFICE | 0 | 1 | 5 | 2 |
| OS REGIONAL OFFICE | 0 | 0 | 2 | 5 |

FIG. 11B

| THRESHOLD | [km] | FREQUENCY RISING VALUE |
|---|---|---|
| 1 | 0 | 5 |
| 2 | $0 < x \leqq 100$ | 4 |
| 3 | $100 < x \leqq 200$ | 3 |
| 4 | $200 < x \leqq 500$ | 2 |
| 5 | $500 < x$ | 1 |

FIG. 11C

VERIFICATION APPARATUS, VERIFICATION METHOD AND VERIFICATION PROGRAM

CROSS REFERENCES TO RELATED APPLICATIONS

The present invention contains subject matter related to Japanese Patent Application JP2006-313211 filed in the Japanese Patent Office on Nov. 20, 2006, the entire contents of which being incorporated herein by reference.

BACKGROUND OF THE INVENTION

1. Field of the Invention

The present invention relates to a verification apparatus, verification method and verification program, and is preferably applied to biometric verification, for example.

2. Description of the Related Art

Biometric verification is often used to prevent identity theft. There is an authentication apparatus (or a verification apparatus) that generates physical trait information from a person's physical trait (such as blood vessel pattern, voice pattern, lip's pattern or the like), which is difficult for someone to forge, and then uses it to identify a user.

Typically, the authentication apparatus has a database that stores the physical trait data of a plurality of legitimate users as "registrant identification data" (a user who has been already registered in the apparatus is also referred to as a "registrant"). To verify a user (a user to be verified is also referred to as a "verification-target user), the authentication apparatus generates from him/her verification-target user's blood vessel image data and then compares it with a plurality of blood vessel image data registered in a database. The authentication apparatus continues it until it finds a matched image.

Theoretically, the authentication apparatus has to check at least half of the registered blood vessel image data until it finds a matched one. Accordingly, it may take a long time to find a matched one if there are a lot of users registered in the database.

As disclosed in Jpn. Pat. Laid-open Publication No. 2006-18676), there is a system that ranks each user's registered blood vessel image data in a certain manner: the registered blood vessel image data of users who have been authenticated frequently are ranked at high. The system checks up the database in that order (also referred to as a "checkup order"). This increases efficiency.

SUMMARY OF THE INVENTION

However, if the above method is applied to an entering-and-leaving management system that checks a person who enters or leaves buildings, it is difficult to maintain an appropriate checkup order because there are many persons who enter or leave the buildings: some of them who are often visit the building may be ranked at low and it may take time to authenticate them.

As a result, the system may need a long time to verify some of the users.

The present invention has been made in view of the above points and is intended to provide a verification apparatus, verification method and verification program by which a user does not have to wait for a long time.

In one aspect of the present invention, a verification apparatus for checking a verification-target data against registrant's identification data, including: a storage section that stores a plurality of first checkup order data each of which defines an order of checking the verification-target data against a plurality of registrant's identification data that are divided in accordance with a predetermined condition into a plurality of first groups; a selection section that selects one of the first checkup order data that is associated with a first group corresponding to the condition; and a checkup section that checks, in accordance with the selected first checkup order data, the verification-target data against a plurality of registrant's identification data in the first group corresponding to the condition.

Accordingly, the number of registrant's identification data whose order is defined in each first checkup order data is less than the total number of registrant's identification data registered in each first group. Therefore the apparatus does not have to check up many registrants' identification data to find out the matched verification-target data. This improves efficiency in authentication.

As noted above, the number of registrant's identification data whose order is defined in each first checkup order data is less than the total number of registrant's identification data registered in each first group. Therefore the apparatus does not have to check up many registrants' identification data to find out the matched verification-target data. This improves efficiency in authentication. Thus a user does not have to wait for a long time.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 4 is a schematic diagram illustrating a registrants' information management database;

FIG. 5 is a schematic diagram illustrating how to divide physical trait information devices into groups;

FIG. 7 is a schematic diagram illustrating a distance between regional groups and their correlations;

FIGS. 11A, 11B, and 11C is a schematic diagram illustrating how to weight in accordance with a distance.

DETAILED DESCRIPTION OF PREFERRED EMBODIMENTS

An embodiment of the present invention will be described in detail with reference to the accompanying drawings.

(1) Entering-And-Leaving Management system

Figure 1:
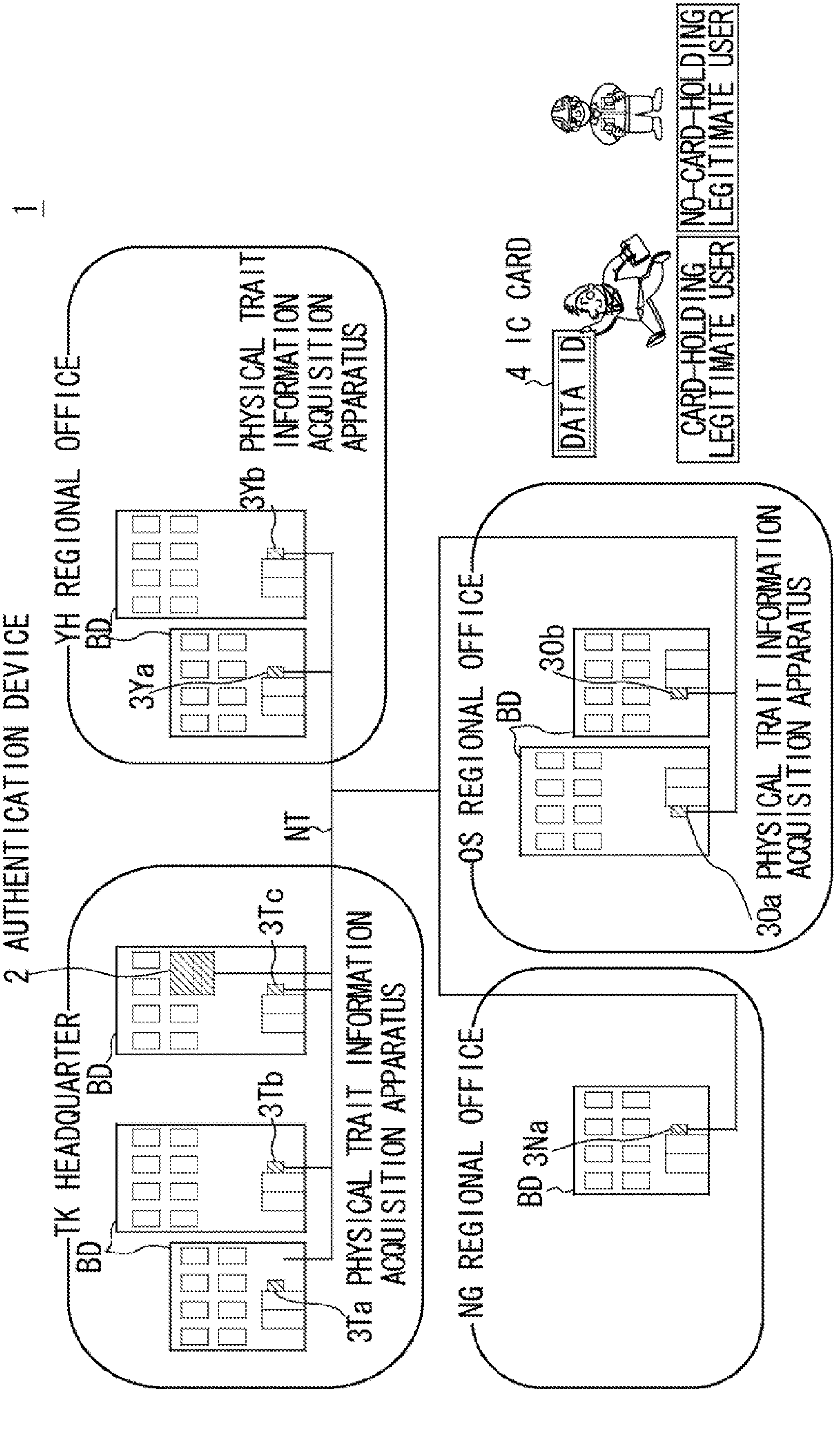
FIG. 1 is a schematic diagram illustrating an entering-and-leaving management system.

In FIG. 1, the reference numeral 1 represents an entering-and-leaving system as a whole. A company S has a headquarter TK and regional offices YH, NG and OS. In this entering-and-leaving management system 1, an authentication device 2, placed in the headquarter TK, controls a physical trait information acquisition devices 3 (3T, 3Y, 3N and 3O) via a network NT.

The physical trait information acquisition device 3 is placed at an entrance of each building BD of the company S. The physical trait information acquisition device 3 acquires from a verification-target user, who wants to enter or leave the building BD, verification-target user's identification data and supplies it to the authentication device 2.

Registrant identification data of a plurality of users who are entitled to enter or leave the building BD are previously registered in the authentication device 2. When the verification-target user's identification data matches with one of the registrant identification data, the authentication device 2 determines that the verification-target user is a legitimate user. The authentication device 2 therefore supplies an admission notification to the physical trait information acquisition device 3.

The physical trait information acquisition device 3 opens an entrance door for a few seconds only when the device 3 has received the admission notification from the authentication device 2.

The authentication device 2 is designed to identify a user based on his/her finger's blood vessel pattern.

The physical trait information acquisition device 3 generates verification-target user's blood vessel image data from his/her finger's blood vessel pattern and then supplies it to the authentication device 2 for verification.

The registrants' blood vessel image data (i.e. registrants' identification data), which represent registrants' blood vessel patterns, have been registered in the authentication device 2. The authentication device 2 checks the verification-target user's blood vessel image data against the registrants' blood vessel image data. If the verification-target user's blood vessel image data matches with one of the registrants' blood vessel image data, the authentication device 2 determines that the verification-target user is a legitimate user.

In this entering-and-leaving management system 1, there are two groups of users, one of which are those who have a storage medium or an IC card 4 and the other are those who do not have the IC card 4.

People who often enter or leave the building BD, such as employees, are entitled to have the IC card 4 and registered accordingly. Those people have the IC card 4 storing a "data ID". The data ID is used to find out a corresponding registrants' blood vessel image data.

The authentication device 2 acquires from a verification-target user who holds his/her IC card 4 (also referred to as a "card-holding verification-target user") the data ID, finds out a corresponding registrant's blood vessel image data based on the acquired data ID, and then compares the verification-target user's blood vessel image data with the registrant's blood vessel image data. Accordingly, the authentication device 2 can identify the user efficiently.

People who do not enter or leave the building BD so often, such as subcontractor's employees, are not entitled to have the IC card 4.

Accordingly, the authentication device 2 does not acquire the data ID from a verification-target user who does not hold the IC card 4 (also referred to as a "no-card verification-target user"). As a result, the authentication device 2 checks the registrants' blood vessel image data in a certain checkup order until it finds out one that matches with the verification-target user's blood vessel image data.

The authentication device 2 also does not acquire the data ID from a verification-target user who are entitled to hold an IC card 4 but forgets to bring the IC card 4 (also referred to as a "card-non-holding verification-target user"). Accordingly, the authentication device 2 checks the registrants' blood vessel image data in a certain checkup order until it finds out one that matches with the verification-target user's blood vessel image data.

If the checkup order is determined such that the registrants' blood vessel image data of the card-holding verification-target users are ranked higher than those of the no-card verification-target users, it takes a long time for the authentication apparatus 2 to verify a no-card verification-target user. On the other hand, if the checkup order is determined such that the registrants' blood vessel image data of the no-card verification-target users are ranked higher than those of the card-holding verification-target users, it takes a long time for the authentication apparatus 2 to verify a card-non-holding verification-target user.

Accordingly, the authentication device 2 is designed to divide the registrants' blood vessel image data into a plurality of groups depending on which users have the IC card 4. The checkup order is determined based on the groups. Following describes an authentication process.

(2) Process of Authentication Device

Figure 2:
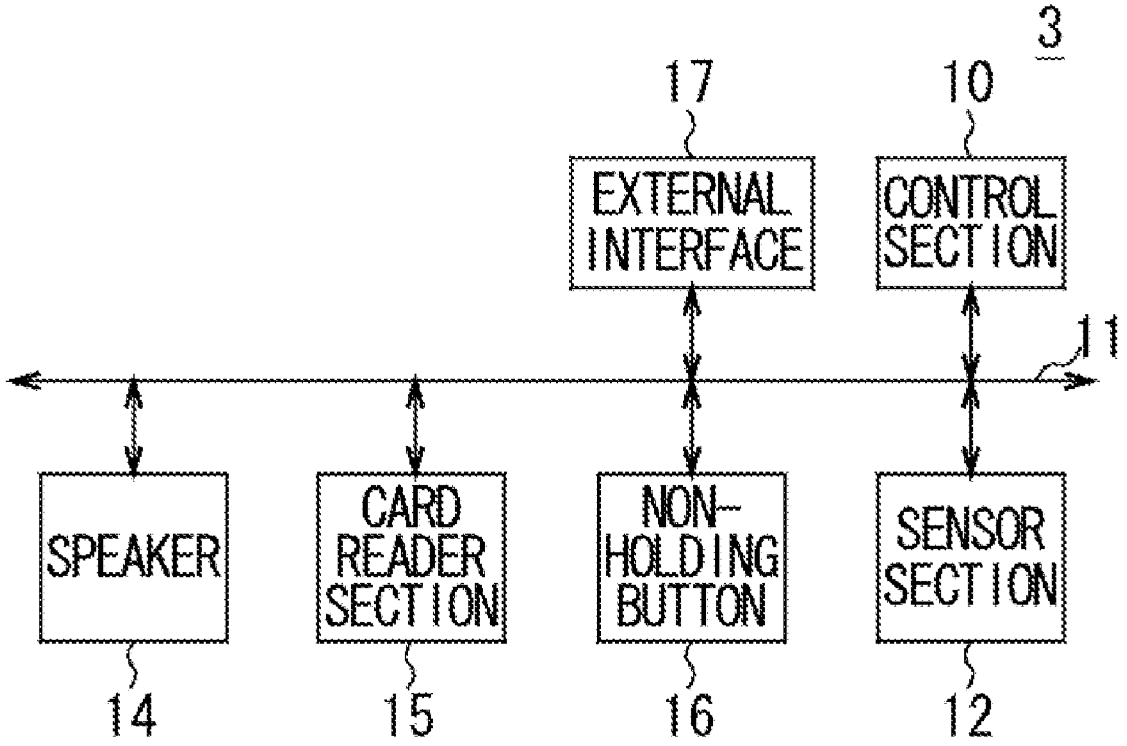
FIG. 2 is a schematic block diagram illustrating the configuration of a physical trait information acquisition device.

FIG. 2 illustrates the configuration of the physical trait information acquisition device 3. The device 3 includes a control section 10 including a Central Processing Unit (CPU), a Read Only Memory (ROM), which stores various programs, and a Random Access Memory (RAM), which serves as a work memory for the CPU. The control section 10 takes overall control of the device 3. The control section 10 controls each component via a bus 11.

When a verification-target user's finger is placed on a sensor section 12, the control section 10 controls the sensor section 12 to take an image of the finger, which is then transformed into image signals. The image signals are processed for edging, smoothing, binarization and thinning. As a result, a blood vessel pattern is extracted from them to generate the verification-target user's blood vessel image data (i.e. the verification-target user's physical identification information).

As noted above, the entering-and-leaving management system 1 including the authentication device 2 and the physical trait information acquisition device 3 may need to verify card-holding verification-target user, card-non-holding verification-target users and no-card verification-target users.

Accordingly, after generating the verification-target user's blood vessel image data, the control section 10 outputs from a speaker 14 a message like "Put your card or press a non-holding button if you forget to bring a card". The control section 10 waits for a predetermined period of time until a user puts his/her IC card 4 on a card reader section 15 or pushes a non-holding button 16.

Accordingly, a card-holding verification-target user should put his/her IC card 4 on the card reader section 15 before the period has passed. A card-non-holding verification-target user should push the non-holding button 16. A no-card verification-target user should wait for a while.

If the user puts his/her IC card 4 on the reader section 15 and the control section 10 obtains a data ID from the card 4, the control section 10 transmits the verification-target user's blood vessel image data, the data ID and a machine ID (which identifies the physical trait acquisition device 3 the verification-target user has accessed) to the authentication device 2 via an external interface 17.

If the user pushes the non-holding button 16, the control section 10 transmits a non-holding verification-target user notification (which informs the fact that the user is a card-non-holding verification-target user), the verification-target user's blood vessel image data and the machine ID to the authentication device 2 via the external interface 17.

If the user did not put the card 4 and did not push the button 16 before the predetermined period has passed, the control section 10 transmits the verification-target user's blood vessel image data and the machine ID to the authentication device 2 via the external interface 17.

Figure 3:
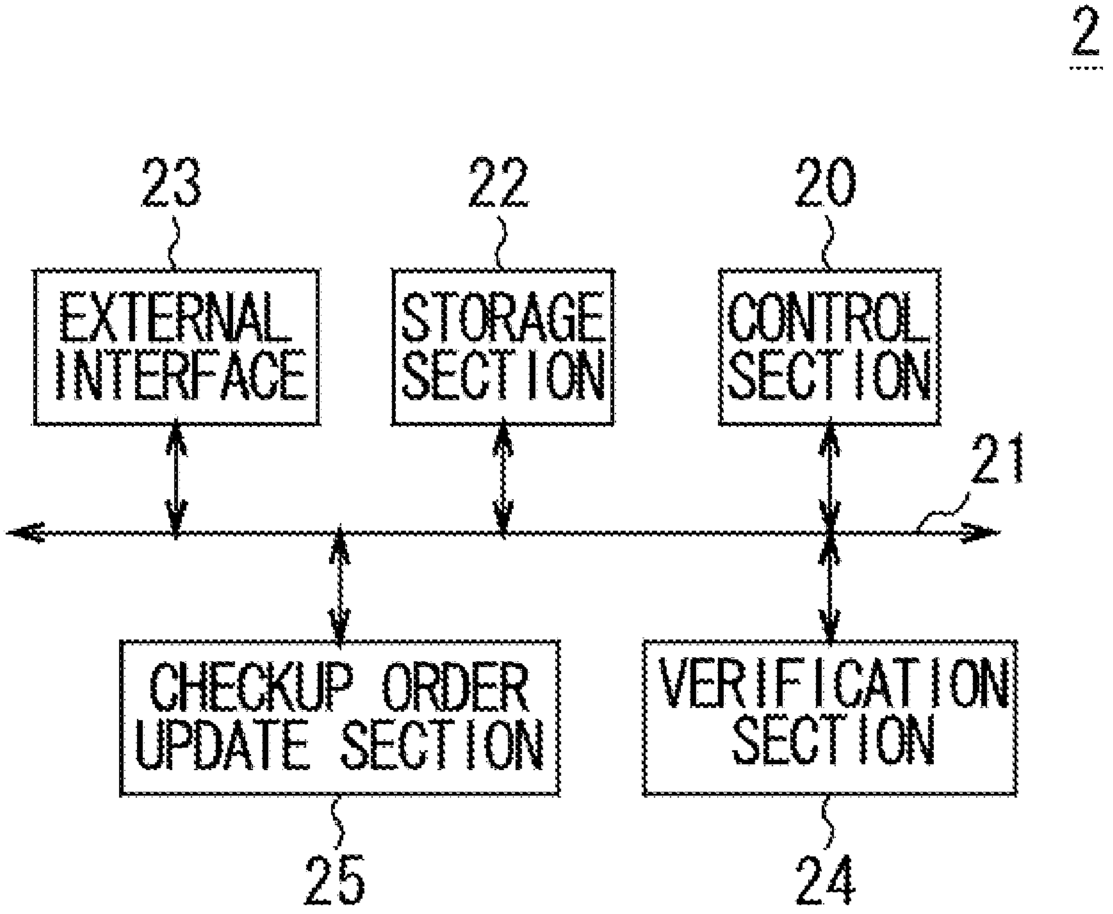
FIG. 3 is a schematic block diagram illustrating the configuration of an authentication apparatus.

FIG. 3 illustrates the configuration of the authentication device 2. The device 2 includes a control section 20 including a Central Processing Unit (CPU), a Read Only Memory (ROM), which stores various programs, and a Random Access Memory (RAM), which serves as a work memory for the CPU. The control section 20 takes overall control of the device 2. The control section 20 controls each component via a bus 21.

A storage section 22 stores the registrants' blood vessel image data and the data IDs: each blood vessel image data is linked to a corresponding data ID. Specifically, the storage section 22 includes a registrant information management data base DB storing the registrants' blood vessel image data and the corresponding data IDs, as shown in FIG. 4.

"A" or "B" is attached to the top of each data ID in the database DB. In this manner, the data IDs are divided into two groups: one for users who are entitled to hold the IC card 4 and the other for users who are not entitled to hold the card 4.

In addition, the storage section 22 also includes a regional group management list GL in which the machine IDs and regional group names are listed such that each machine ID is linked to a corresponding regional group name, as shown in FIG. 5. In this manner, the authentication device 2 can recognize which device 3 belongs to which regional group (a headquarter TK, or a regional office YH, NG or OS).

Figure 6:
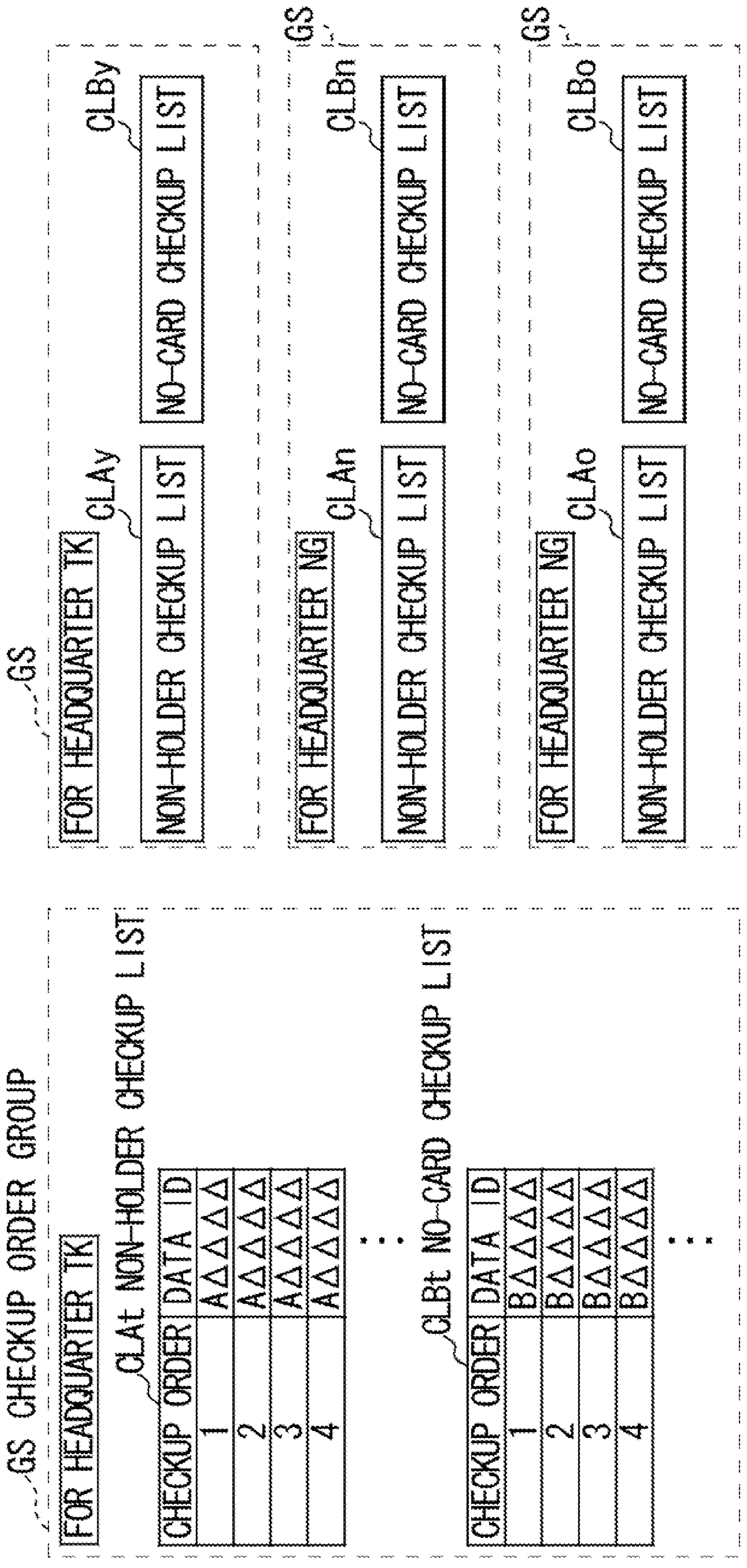
FIG. 6 is a schematic diagram illustrating a checkup order list.

In addition, as shown in FIG. 6, the storage section 22 also stores checkup order lists CL: four non-holder checkup lists CLA (CLAt, CLAy, CLAn and CLAo) and four no-card checkup lists CLB (CLBt, CLBy, CLBn and CLBO).

Each checkup order list CL lists the data IDs of the registrants' blood vessel image data in ascending order. In addition, the registrants' blood vessel image data are divided into two groups: one for users who are entitled to hold the card 4 and the other for users who are not entitled to do so. The non-holder checkup lists CLA lists only data of the card holders while the no-card checkup list CLB lists only data of users who are not entitled to hold the card 4.

In addition, a pair of a non-holder checkup list CLA and a no-card checkup list CLB is regarded as one group called a "checkup order group GS". A checkup order group GS is linked to a corresponding regional group.

In this embodiment, when receiving from the physical trait information acquisition apparatus 3 the verification-target user's blood vessel image data, the control section 20 acquires "verification-target user's status information" such as the data ID, the non-holding verification-target user notification and the machine ID. Based on the verification-target user's status information, the control section 20 checks if the user is entitled to hold the IC card 4 and which regional group the acquisition device 3, to which the verification-target user's blood vessel image data is input, belongs to.

Specifically, based on the data ID the control section 20 checks if the user is entitled to hold the IC card 4. In addition, the control section 20 checks if the user who has accessed the physical trait information acquisition device 3 holds an IC card 4 that corresponds to the checkup order list CL or not.

Moreover, the control section 20 checks if the non-holding button 16 has been pushed or not based on the non-holding verification-target user notification. The control section 20 also checks that the user who does not bring the IC card is: a card-non-holding verification-target user who is entitled to hold the card and listed in the list CLA; or a no-card verification-target user who is not entitled to hold the card and is listed in the list CLB.

In that manner, the users are divided into three types: a card-holding verification-target user who is not listed in the list CL, a card-non-holding verification-target user listed in the list CL or a no-card verification-target user.

When the verification-target user is a card-non-holding verification-target user listed in the list CL or a no-card verification-target user, the control section 20 checks which group (TK, YH, NG or OS) the acquisition device 3, from which the verification-target user's blood vessel image data was input, belongs to based on the machine ID.

Furthermore, the control section 20 selects from the checkup order group GS corresponding to that regional group one checkup order list CL which corresponds to the card-non-holding verification-target user or the no-card verification-target user.

When the control section 20 verifies a card-holding verification-target user, the control section 20 finds out the corresponding registrant's blood vessel image data in accordance with the data ID. When the control section 20 verifies a card-non-holding verification-target user or a no-card verification-target user, the control section 20 selects one of the checkup order lists CL and performs a verification process in accordance with the selected list CL.

Specifically, when having received the data ID, along with the verification-target user's blood vessel image data, from the acquisition device 3 via the external interface 23, the control section 20 determines that the verification-target user is a card-holding verification-target user. In this case, the control section 20 finds out a corresponding registrant's blood vessel image data from the database DB in accordance with the data ID. The verification section 24 subsequently performs a verification process.

The verification section 24 compares the registrant's blood vessel image data and the verification-target user's blood vessel image data to calculate a correlation value. If the correlation value is greater than or equal to a predetermined threshold, the verification section 24 determines that the registrant's blood vessel image data matches with the verification-target user's blood vessel image data and notifies the control section 10 accordingly.

Whereas if the correlation value is less than the threshold, the verification section 24 determines that the registrant's blood vessel image data does not match with the verification-target user's blood vessel image data and notifies the control section 10 accordingly.

When being notified of the fact that they matched with each other, the control section 20 determines that the verification-target user is legitimate.

By contrast, when being notified of the fact that they did not match with one another, the control section 20 determines that the verification-target user is not legitimate.

When having received the non-holding verification-target user notification, along with the verification-target user's blood vessel image data, from the acquisition device 3 via the external interface 23, the control section 20 determines that the verification-target user is a card-non-holding verification-target user. When having received only the verification-target user's blood vessel image data from the acquisition device 3 via the external interface 23, the control section 20 determines that the verification-target user is a no-card verification-target user.

The control section 20 reads out the regional group management list GL from the storage section 22. Based on the list GL and the machine ID which was received along with the verification-target user's blood vessel image data, the control section 20 determines which regional group the acquisition device 3, to which the verification-target user's blood vessel image data was input, belongs to, and selects a corresponding group's checkup order group GS.

Moreover, as for a card-non-holding verification-target user, the control section 20 selects a non-holder checkup list CLA from the selected checkup order group GS. As for a no-card verification-target user, the control section 20 selects a no-card checkup list CLB from the selected checkup order group GS.

The control section 20 performs a verification process (in the same way as card-holding verification-target user) for the registrant's blood vessel image data of the data ID listed at the top of the checkup order list CL (i.e. one that ranked No. 1).

When being notified by the verification section 24 of the fact that they matched, the control section 20 determines that the verification-target user is legitimate.

On the other hand, when being notified by the verification section 24 of the fact that they did not match, the control section 20 determines that the verification-target user is not legitimate.

In this case, the control section 20 retries a verification process for the registrant's blood vessel image data ranked at a subsequent place of the list CL. If the verification-target user's blood vessel image matches with the registrant's blood vessel image data, the control section 20 determines that the verification-target user is a registered legitimate user.

On the other hand, the control section 20 controls the verification section 24 to continue the verification process until it has checked up all the registrants' blood vessel image data. If the control section 20 cannot find out one that matches with the verification-target user's blood vessel image data from all the registrants' blood vessel image data, the control section 20 determines that the verification-target user is not legitimate.

When it determines that the verification-target user is a legitimate registered user, the control section 20 transmits an admission data to the acquisition device 3 via the external interface 23 to allow the user to enter or leave the building. On the other hand, when it determines that the verification-target user is not a legitimate registered user, the control section 20 transmits an authentication error notification to the acquisition device 3, which is one corresponding to the machine ID, via the external interface 23. The control section 20 subsequently performs a checkup order list update process (described later) and then ends the process.

When having received the admission notification via an external interface 17, the control section 10 of the physical trait information acquisition device 3 opens the entrance door of the building BD (FIG. 1) for a while to allow the user to enter or leave the building. After that, the control section 10 closes the door and then ends the process.

On the other hand, when having received the authentication error notification via the external interface 17, the control section 10 of the acquisition device 3 outputs from a speaker 14 a message like "Verification is failed", and then ends the process.

In that manner, in the entering-and-leaving management system 1, users are divided into two groups: a group of people who are registered in the system and entitled to hold the IC card 4 and a group of people who are registered in the system but not allowed to hold the IC card 4. The system 1 also includes two checkup order lists CL. Based on the checkup order lists CL, the users have been registered in the system 1. Accordingly, the number of users who are registered in the system as a user entitled to hold the card or the number of users who are registered in the system as a user not allowed to have a card is less than the total number of users. This reduces the number of the registrants' blood vessel image data that the apparatus has to check up.

In addition, there is the checkup order lists CL for the card-non-holding verification-target users and the no-card verification-target users. Accordingly, the apparatus can authenticate those users efficiently by checking up data in an appropriate checkup order specified in the checkup order lists CL. This improves efficiency.

Furthermore, the entering-and-leaving management system 1 includes a non-holder checkup lists CLA for the card-holding verification-target users. When a data ID is not input into the acquisition device 3, the system 1 performs a verification process in accordance with the non-holder checkup lists CLA. Accordingly, the system 1 can verify a card-non-holding verification-target user.

Furthermore, the acquisition devices 3 belong to regional groups. The system 1 performs a verification process in accordance with the checkup order list CL that corresponds to a regional group the acquisition device 3, to which the verification-target user's data is input, belongs to. Accordingly, the system 1 checks users' data in its region's appropriate order. This improves efficiency.

In this case, the checkup order lists CL for regional groups are registered such that users who are entitled to hold the card and the other users who are not entitled to hold the card belong to one checkup order group. Accordingly, all the registered users can be verified through any acquisition devices 3 in different regions. In addition, the user may be verified efficiently depending on how often they are verified in each regional group.

(3) Checkup Order List Update Process

The following describes how to update the checkup order lists when the authentication apparatus determines that a verification-target user is legitimate.

The entering-and-leaving management system 1 covers many regional areas. Accordingly, there may be many people who often enter or leave the building BD of a particular regional group. In addition, it can be assumed that those people who enters or leaves a particular region's building may also often visit a neighboring building.

Accordingly, the system 1 of the present embodiment takes into consideration an adjacent regional group as well as a regional group (also referred to as a "reference regional group") a user often visits before updating a corresponding checkup order list CL.

As shown in FIG. 7, the storage section 22 of the authentication device 2 stores a distance list LL that shows distances between the regional groups. The distance list LL shows a distance from a reference regional group on the left column to each regional group.

The control section 20 determines that, if a distance from a reference regional group to another regional group is less than or equal to a predetermined threshold (i.e. they are close), their closeness is high. The control section 20 recognizes them as neighboring regional groups whose lists CL are updated at the same time. In this case (FIG. 7), the threshold is 350 km and adjacent regional groups are hatched.

After the control section 20 has verified a user through a certain region's acquisition device 3, a checkup order update section 25 (FIG. 3) updates a checkup order list CL that were used for that verification process (this list CL is one of the checkup order lists CL corresponding to that acquisition device 3 and has been selected based on the non-holding verification-target user notification): the registrant's blood vessel image data of the verified user is ranked at No. 1 and the other registrants' blood vessel image data are brought down to one lower rank.

In this manner, the users who are often authenticated in the reference regional group are ranked at high in the checkup order list CL. This reduces the time needed to verify those users and improves efficiency.

In addition, the result of authentication in the reference regional group will be reflected on the neighboring regional groups. The checkup order update section 25 selects, from the checkup order group GS corresponding to the neighboring regional group, a checkup order list CL based on non-holding verification-target user notification indicating whether the IC card 4 has been delivered to the user or not. The checkup order update section 25 also updates the selected list CL.

In that manner, the result of authentication in the reference regional group will be reflected on the neighboring regional group and its checkup order list CL. This improves efficiency even when a user who has been authenticated in the reference regional group is authenticated in a neighboring regional group.

Figure 8:
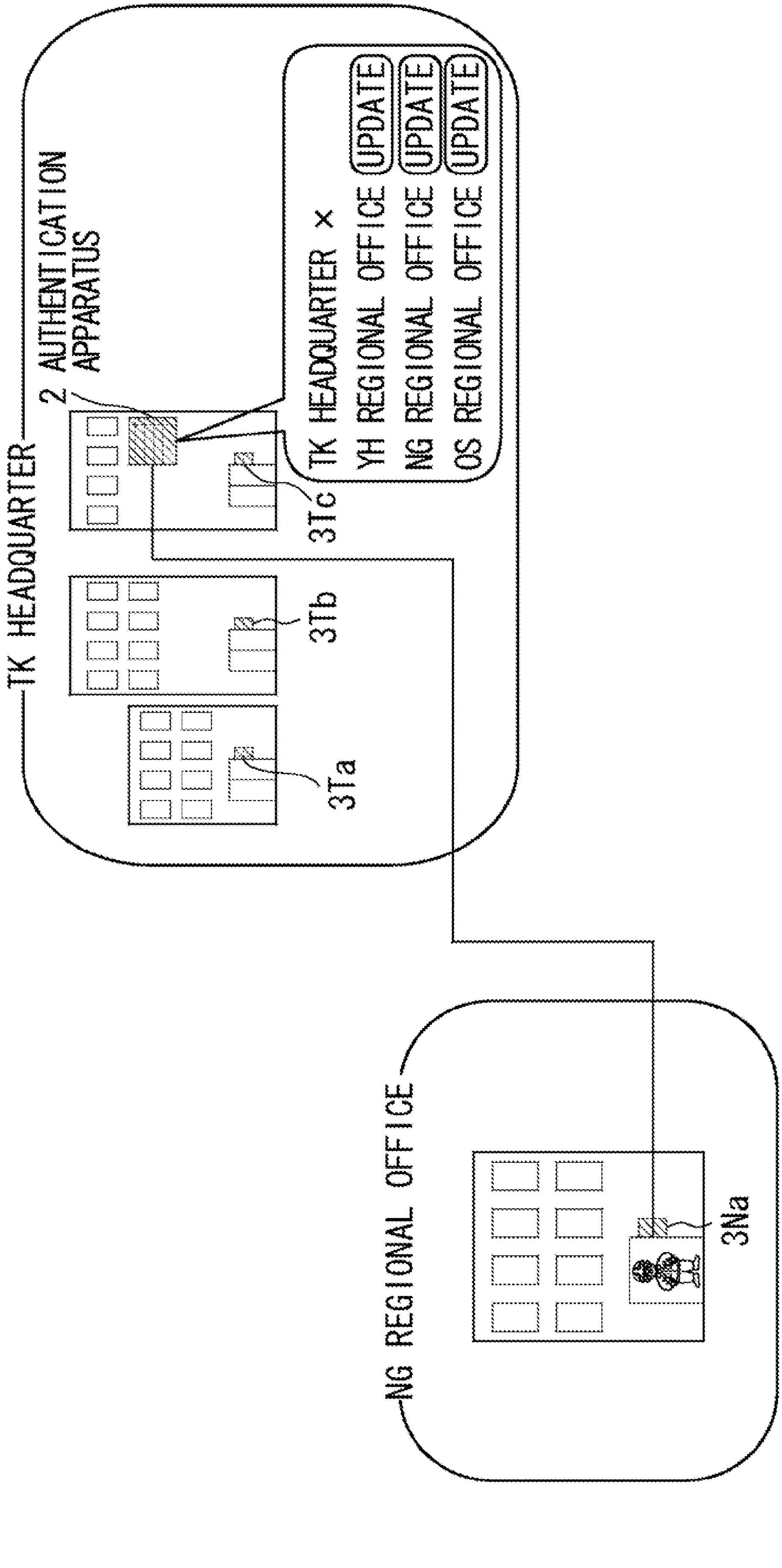
FIG. 8 is a schematic diagram illustrating how to update a checkup order list.

For example, as shown in FIG. 8, the control section 20 authenticates a verification-target user as a no-card verification-target user via the regional office NG's acquisition device 3N. In this case, a reference regional group is a regional office NG while its neighboring regional groups are regional offices YH and OS. Accordingly, the no-card checkup list CLBn of the regional office NG is updated. At the same time, the no-card checkup lists CLBy and CLBO of the regional offices YH and OS are updated. In that manner, the result of update on the no-card checkup list CLBn of the regional office NG is also reflected on the no-card checkup lists CLBy and CLBO of the regional offices YH and OS.

By the way, the checkup order list update process is performed only for the card-non-holding verification-target users and no-card verification-target users corresponding to the checkup order list CL. The checkup order list update process is not performed for the card-holding verification-target users not corresponding to the checkup order list.

That means that, when the control section 20 authenticates a card-holding verification-target user as a legitimate user, the frequency of authenticating the card-holding verification-target user is not reflected on the non-holder checkup lists CLA in which the users who are entitled to hold the card 4 are registered.

Accordingly, the legitimate users who often forget to bring the IC card 4 are ranked at high places in the non-holder checkup lists CLA. On the other hand, the legitimate users who are often authenticated and always carry his/her IC card 4 are ranked at low levels in the non-holder checkup lists CLA. This improves efficiency in authenticating the legitimate users who are entitled to hold the IC card 4 but often forget to carry his/her IC cards 4.

Figure 9:
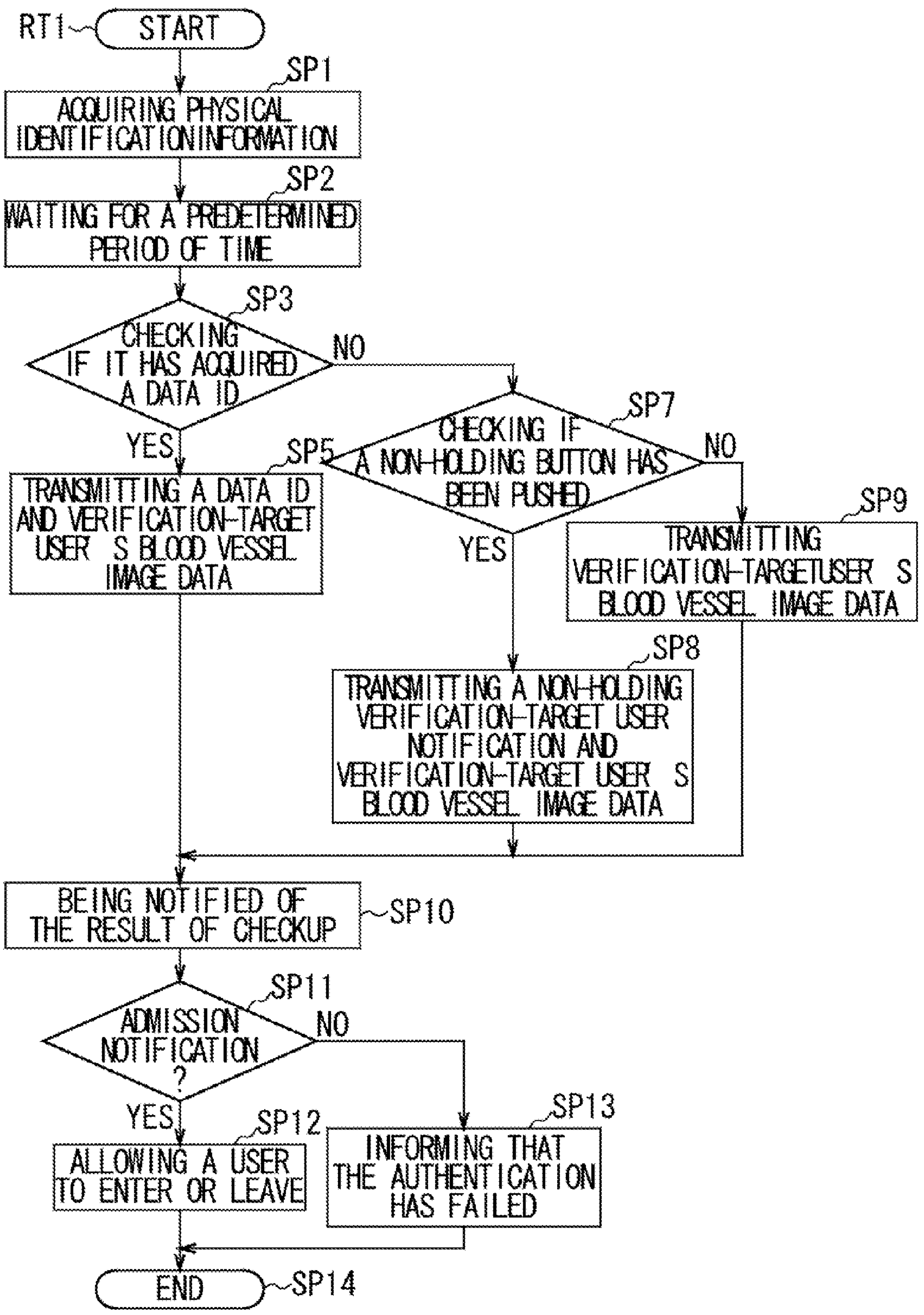
FIG. 9 is a flowchart illustrating an authentication intermediate process by a physical trait information acquisition device.

(4) Authentication Process (4-1) Authentication Intermediate Process by Physical Trait Information Acquisition Device FIG. 9 is a flowchart illustrating an authentication intermediate process performed by the acquisition device 3, a part of the above-noted authentication process.

When a verification-target user's finger is put on the sensor section 12, the control section 10 of the physical trait information acquisition device 3 starts a procedure RT1 of the authentication intermediate process. At step SP1, the control section 10 receives a verification-target user's blood vessel image data as his/her physical trait information and then proceeds to step SP2.

At step SP2, the control section 10 waits for a predetermined period of time and then proceeds to step SP3.

At step SP3, the control section 10 checks if it has received a data ID which is supplied as a result of putting the IC card 4 on the reader during the predetermined period of time. If the control section has acquired the data ID, then it proceeds to step SP5. At step SP5, the control section supplies the data ID and the verification-target user's blood vessel image data and the machine ID to the authentication apparatus 2, and then proceeds to step SP10.

Whereas if the control section 10 did not receive the data ID at step SP3, the control section 10 proceeds to step SP7. At step SP7, the control section 10 check if the non-holding button 16 has been pushed during the predetermined period of time.

If the non-holding button 16 has been pushed, the control section 10 proceeds to step SP8. At step SP8, the control section 10 supplies a non-holding verification-target user notification and the verification-target user's blood vessel image data and the machine ID to the authentication apparatus 2 and then proceeds to step SP10.

Whereas if the non-holding button 16 was not pushed at step SP7, the control section 10 proceeds to step SP9. At step SP9, the control section 10 supplies the verification-target user's blood vessel image data and the machine ID to the authentication apparatus 2 and then proceeds to step SP10.

At step SP10, the control section 10 waits until being notified by the authentication apparatus 2 of the result of authentication. After being notified of the result, the control section 10 proceeds to step SP11.

At step SP11, the control section 10 checks if it has received an admission notification as a result of authentication.

If the control section 10 has received the admission notification, this means that the verification-target user is a legitimate user and allowed to enter or leave the building. In this case, the control section 10 proceeds to step SP12. At step SP12, the control section 10 opens an entrance door of the building BD for a few seconds and then proceeds to step SP14 to end the process.

Whereas if the control section 10 did not receive the admission notification at step SP11, this means that the control section 10 has received an authentication error notification and that the verification-target user is not legitimate. In this case, the control section 10 proceeds to step SP13 and informs that the authentication is failed for the verification-target user. The control section 10 subsequently proceeds to step SP14 and end the process.

(4-2) Authentication Process of Authentication Device

Figure 10:
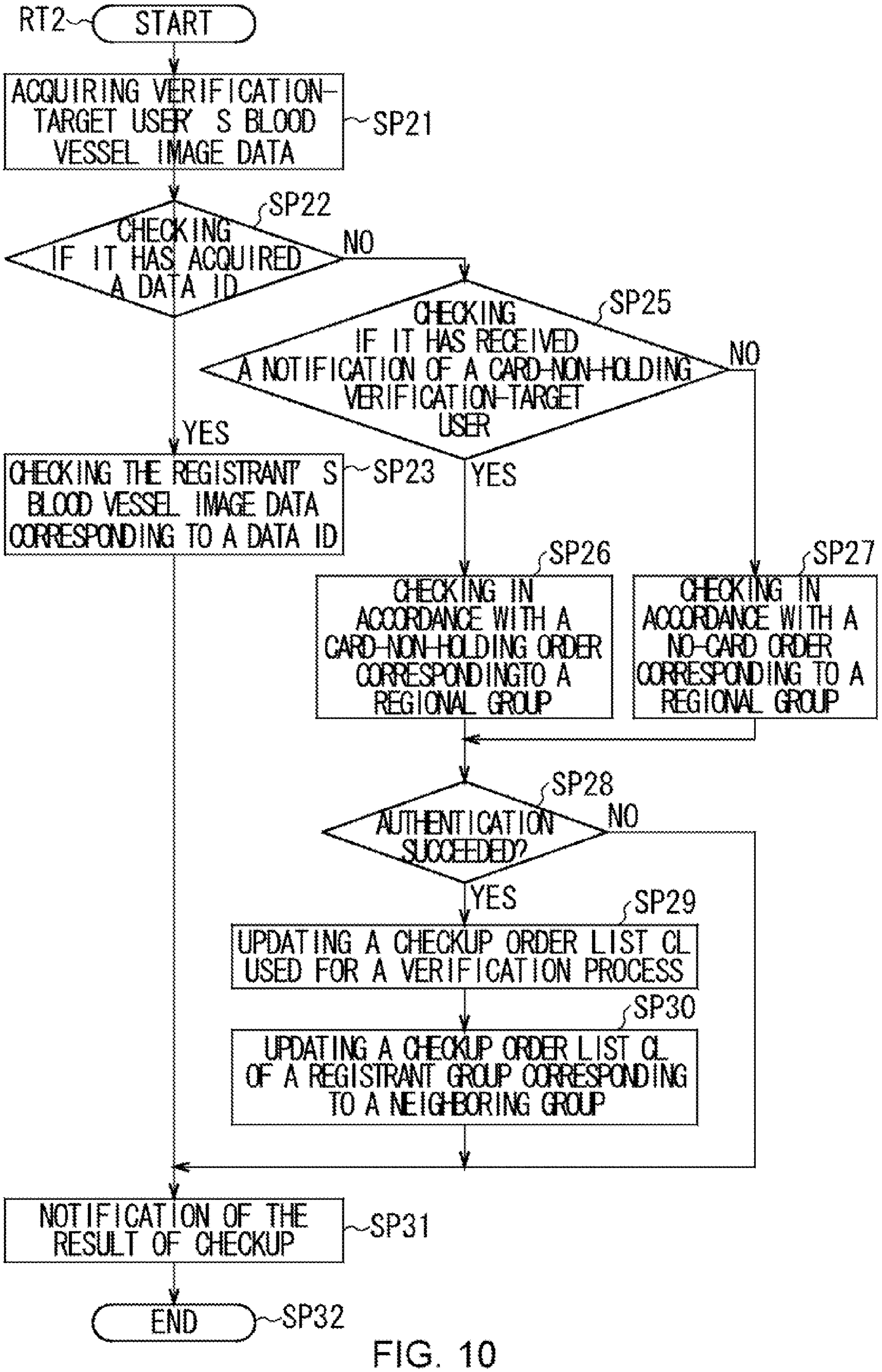
FIG. 10 is a flowchart illustrating an authentication process by an authentication device.

FIG. 10 is a flowchart illustrating an authentication process performed by the authentication device 2 that executes an authentication program, a part of the above-noted authentication process.

The control section 20 of the authentication device 2 starts a procedure RT2 of authentication process. At step SP21, the control section 20 receives a verification-target user's blood vessel image data from the acquisition device 3 and then proceeds to step SP22.

At step SP22, the control section 20 checks if it has received the data ID along with the verification-target user's blood vessel image data.

If the control section 20 has received the data ID, this means that the verification-target user is a card-holding verification-target user. In this case, the control section 20 proceeds to step SP23 and selects one of the registrants' blood vessel image data in accordance with the data ID. The control section 20 subsequently performs a verification process and then proceeds to step SP31.

Whereas if the control section 20 has not received the data ID at step SP22, the control section 20 proceeds to step SP25. At step SP25, the control section 20 check if it has received a non-holding verification-target user notification along with the verification-target user's blood vessel image data at step SP22.

If the control section 20 has received a non-holding verification-target user notification, this means that the verification-target user is a card-non-holding verification-target user. In this case, the control section 20 proceeds to step SP26.

At step SP26, the control section 20 selects a non-holder checkup lists CLA from a checkup order group GS corresponding to a regional group in which the acquisition device 3 of the machine ID (i.e. the device the verification-target user has accessed) is placed. The control section 20 subsequently checks the registrants' blood vessel image data in accordance with the selected list CLA until it finds out one that matches with the verification-target user's blood vessel image data or it has checked all the registrants' blood vessel image data. The control section 20 subsequently proceeds to step SP28.

Whereas if the control section 20 has not received a non-holding verification-target user notification at step SP25, this means that the verification-target user is a no-card verification-target user. The control section 20 proceeds to step SP27.

At step SP27, the control section 20 selects a no-card checkup list CLB from a checkup order group GS corresponding to a regional group in which the acquisition device 3 of the machine ID (i.e. the device the verification-target user has accessed) is placed. The control section 20 subsequently checks the registrants' blood vessel image data in accordance with the selected list CLB until it finds out one that matches with the verification-target user's blood vessel image data or it has checked all the registrants' blood vessel image data. The control section 20 subsequently proceeds to step SP28.

At step SP28, the control section 20 check if the authentication has succeeded as a result of checking the verification-target user's blood vessel image data against the registrants' blood vessel image data. If the authentication has succeeded, the control section 20 proceeds to step SP29 and update the order of the checkup order list CL used for this authentication process. The control section 20 subsequently proceeds to step SP30.

At step SP30, the control section 20 selects, in accordance with whether the IC card 4 has been delivered or not, a checkup order list CL from a checkup order group GS corresponding a neighboring regional group with respect to a reference regional group the acquisition apparatus 3 of the machine ID belongs to.

In addition, the control section 20 updates the order of the selected list CL and then proceeds to step SP31.

At step SP31, if the authentication has succeeded, the control section 20 supplies an admission notification to the acquisition device 3. Whereas if the authentication has failed, the control section 20 supplies an authentication error notification to the acquisition device 3. The control section 20 subsequently proceeds to step SP32 to end the process.

(5) Operation and Effect

The authentication device 2 of the entering-and-leaving management system 1 provides two first groups each of which corresponds to a card-holding legitimate user (who has been registered in the system and entitled to hold the card 4) or no-card-holding legitimate user (who has been registered in the system but not allowed to carry the card 4) distinguished based on whether the IC card 4 has been delivered or not. Only the card-holding legitimate user and no-card-holding legitimate user are registered in two checkup order list CL (first checkup order data), i.e. the non-holder checkup lists CLA and the no-card checkup list CLB. The authentication 2 checks if the IC card 4 has been delivered based on the non-holding verification-target user notification. Based on the result of checking, the authentication device 2 selects one of the checkup order lists CL and then checks the verification-target user's blood vessel image data (verification-target user's identification data) against the registrants' blood vessel image data (registrants' identification data) in accordance with the selected list CL.

The number of registrants' blood vessel image data registered in each list CL is less than the total number of data registered in both the non-holder checkup lists CLA and the no-card checkup list CLB. Accordingly, the number of data the authentication apparatus has to check up decreases. This improves efficiency in checking the verification-target user's blood vessel image data against the registrants' blood vessel image data.

In addition, the authentication device 2 is connected to the acquisition devices 3 (a plurality of data input apparatuses) in each regional group (second group) via the network. A pair of a non-holder checkup lists CLA and a no-card checkup list CLB is collectively in one checkup order group GS and is registered in each regional group section. The authentication device 2 selects in accordance with whether the non-holding verification-target user notification exists or not, a checkup order list CL from a checkup order group GS corresponding to a regional group the acquisition device 3, to which the verification-target user's blood vessel image data was input, belongs to. The authentication device 2 subsequently checks the verification-target user's blood vessel image data against the registrants' blood vessel image data in accordance with the selected list CL.

In that manner, all the legitimate users are registered in each checkup order group GS. Accordingly, a verification-target user can access any regional groups. In addition, the authentication device 2 can perform an authentication process in an appropriate checkup order suitable for each regional group.

In addition, the authentication device 2 can select a checkup order list CL in accordance with: whether the IC card 4 has been delivered or not; and a regional group the acquisition device 3, to which the verification-target user's blood vessel image data was input, belongs to. Therefore, the authentication device 2 can select an appropriate list CL more precisely than when selecting a checkup order list CL in accordance with: whether the IC card 4 has been delivered or not; or a regional group the acquisition device 3, to which the verification-target user's blood vessel image data was input, belongs to.

Furthermore, the authentication device 2 can recognize, based on the verification-target user's status information such as the non-holding verification-target user notification and the machine ID, the status of the verification-target users in terms of two points: a type of registration; and a regional group the acquisition device 3 the verification-target user has accessed belongs to. Based on the recognized status, the authentication device 2 can perform an authentication process in an appropriate checkup order.

According to the above configuration, the registrants' identification data are divided, in accordance with the status of the verification-target users, into a plurality of groups. The authentication apparatus checks the verification-target user's blood vessel image data against the registrants' blood vessel image data in a checkup order suitable for each group. This improves efficiency in checking data. Thus, a user does not have to wait for a long time.

(6) Other Embodiments

In the above-noted embodiment, the update process of the checkup order list CL is performed in accordance with a distance. However, the present invention is not limited to this. A distance may affect how to update the checkup order list CL.

In this case, for example, as shown in FIG. 11A, a checkup order list CL, stored in the storage section 22 of the authentication device 2, contains a authentication frequency value representing how often corresponding user has been authenticated, as well as the order of checkup and the data ID. The order of checkup is determined based on the authentication frequency value: the data is ranked at high as the authentication frequency value is large.

In this case, the checkup order update section 25 does not directly change the checkup order: The section 25 adds a frequency rising value to the authentication frequency value and uses it to change the checkup order.

As shown in FIG. 11B, the frequency rising value varies according to a distance and is determined based on a frequency rising value list UL stored in the storage section 22. The authenticated verification-target user directly accesses the frequency rising value list UL. Accordingly, the frequency rising value list UL represents a frequency rising value to be added the authentication frequency value of each regional group (in this case, it is assumed that a regional group the acquisition device 3, to which the verification-target user's blood vessel image data was input, belongs to is a reference regional group (left column)).

The frequency rinsing value is determined by setting first to fifth thresholds (FIG. 1C) based on a distance between regions (FIG. 7A). The frequency rinsing value becomes large when a distance between regions is small and the closeness between regions is high. The frequency rinsing value becomes small when the closeness between regions is low.

Accordingly, if the system authenticates a no-card verification-target user via the acquisition device 3 in the regional office NG, the checkup order update section 25 adds "5" to the authentication frequency value of the regional office NG's no-card checkup list CLB. At the same time, the checkup order update section 25 adds "1" and "2" to the authentication frequency values of the regional office YH's no-card checkup list CLBy and regional office OS's no-card checkup list CLBo. The checkup order update section 25 changes the order of the no-card checkup lists CLB based on the adjusted authentication frequency values.

In that manner, the order of the checkup order list CL is affected by not only the closeness but also how often the verification-target user visits other regional groups. The frequency rising value varies according to the closeness. Accordingly, the data of the neighboring regional groups are slightly affected by the data of the reference regional group. Thus, the checkup order list CL can be updated in accordance with the closeness.

In that manner, when the authentication device 2 authenticates a verification-target user as a legitimate user, the device 2 increases the authentication frequency value registered in the checkup order list CL corresponding to a reference regional group in accordance with which regional group the acquisition device 3, to which the verification-target user's blood vessel image data was input, belongs to. At the same time, the device 2 also increases the authentication frequency value corresponding to the neighboring regional groups whose closeness with the reference regional group is high. In this manner, the update of the checkup order list CL of the reference regional group is reflected on that of the neighboring regional groups.

In this case, the update of the checkup order list CL of the reference regional group is not reflected on that of the neighboring regional groups directly. The authentication device 2 adds to the checkup order lists CL of the neighboring regional groups a frequency rising value which varies according to its closeness with the reference regional group. In this manner, the frequency of authentication in the reference regional group is partly reflected on the checkup order lists CL of the neighboring regional groups. How much it is reflected on the checkup order lists CL of the neighboring regional groups varies according to the closeness.

In that manner, the closeness between the reference and neighboring regional groups is appropriately reflected on the checkup orders: a user who often visits the buildings is ranked at high places in the list. This improves efficiency in authentication.

By the way, an authentication frequency value may be determined by accumulating values for a predetermined period of time: The period can be for example six months. This means that the checkup order is adjusted based on the recent results of authentication. An authentication frequency value may be reset in personnel reshuffles.

Instead of setting the authentication frequency values, the system may simply raise the rank of the registrant's blood vessel image data when a corresponding user is authenticated. For example, if the rank may rise by an amount equivalent to the authentication frequency value and a no-card verification-target user is authenticated as a legitimate user through the regional office NG's acquisition device 3, the rank of the authenticated user's blood vessel image data may rise by 5 in the no-card checkup list CLBn corresponding to a reference regional group. At the same time, the positions of the authenticated user's blood vessel image data may increase by 1 and 2 in the no-card checkup lists CLBy and CLBo, respectively.

Furthermore, in the above-noted embodiment, the closeness varying according to a distance is used. However, the present invention is not limited to this. The closeness may be determined based on: observing how often the legitimate user visits different regions for a predetermined period of time; or the correlation between the regional groups in terms of business content.

Furthermore, in the above-noted embodiment, the device waits for a while after a user puts his/her finger on the sensor section 12 and determines that the user is a card-holding verification-target user, a card-non-holding verification-target user or a no-card verification-target user based on whether the no-holding button has been pushed or not or whether the IC card 4 has been placed on the reader or not. However, the present invention is not limited to this. The device may determine that the user is a card-holding verification-target user, a card-non-holding verification-target user or a no-card verification-target user based on whether the no-holding button has been pushed or not or whether the IC card 4 has been placed on the reader or not, before the user puts his/her finger on the sensor section 12.

This allows the device to find out what kind of user he/she is before his/her finger is placed on the sensor section 12. Accordingly, the device can perform a verification process immediately, and the control section 10 of the acquisition device 3 does not have to wait for a while. This reduces the total time needed to authenticate a user.

Furthermore, in the above-noted embodiment, when the verification-target user is a card-holding verification-target user, the checkup order list update process is not performed. However, the present invention is not limited to this. Even when the verification-target user is a card-holding verification-target user, the checkup order list update process can be performed. In this case, for example, its frequency rising value becomes smaller than that of the card-non-holding verification-target users. This maintains the ranks of the card-non-holding verification-target users at high positions.

Furthermore, in the above-noted embodiment, a regional group within 350 km of a reference group is regarded as a neighboring regional group. However, the present invention is not limited to this. The definition of the neighboring regional groups may be determined in various manners depending on the configuration or use of the system.

Furthermore, in the above-noted embodiment, the storage section 22 of the authentication device 2 stores the checkup order lists CL. However, the present invention is not limited to this. Each acquisition device 3 may store a corresponding checkup order list CL.

Furthermore, in the above-noted embodiment, the acquisition devices 3, which are divided into a plurality of regional groups, are connected to the authentication device 2 as if each regional group contains the checkup order groups. However, the present invention is not limited to this. If the authentication device 2 contains the checkup order lists corresponding to the verification-target users divided into groups, this can present the same effect as the above-noted embodiment. In this case, the acquisition devices 3 may not be divided into groups. The same could be said for the authentication device 3 including the acquisition device 3.

Furthermore, in the above-noted embodiment, the authentication device 2 includes the checkup order lists CL in which the registrants' blood vessel image data, which have been divided into groups depending on the types of registration, are registered. However, the present invention is not limited to this. If the acquisition devices 3, which are divided into a plurality of regional groups, are connected to the authentication device 2 as if each regional group contains the checkup order list CL, this can present the same effect as the above-noted embodiment. In this case, the registrants' blood vessel image data may not be divided into groups.

Furthermore, in the above-noted embodiment, a non-holder checkup list CLA and a no-card checkup list CLB is collectively regarded as one checkup order group and it is stored in a corresponding regional group section. However, the present invention is not limited to this. One checkup order list CL, which lists all the data registered in the lists CLA and CLB, may be stored in a corresponding regional group section.

Furthermore, in the above-noted embodiment, the rank of a card-non-holding verification-target user becomes 1st after the update process. However, the present invention is not limited to this. There may be: an additional checkup order list for one day only, in which the rank of a card-non-holding verification-target user becomes 1st; and a long-term checkup order list in which the ranks are adjusted in accordance with the frequency of authentication.

In this case, when the checkup order list update process is performed, the rank of a card-non-holding verification-target user becomes 1st in the checkup order list for one day only, while the checkup order list that uses the authentication frequency values is updated by adding the frequency rising values.

That means that the verification-target users are verified in a checkup order that is determined based on how often they forget to carry the IC card 4. In addition, it is assumed that a card-non-holding verification-target user, who forgets to carry his/her card 4, may not have it with him/her for the whole day. Accordingly, once a user is recognized as a card-non-holding verification-target user, his/her checkup order (or rank) is maintained at high places in that day. This improves efficiency in authenticating those card-non-holding verification-target users.

Furthermore, in the above-noted embodiment, in accordance with whether the IC card 4 has been delivered or not, the registrants' blood vessel image data are divided into two groups: a group for people who are entitled to hold the card 4 and a group for people who are not entitled to hold the card 4. However, the present invention is not limited to this. They may be divided into groups such as a night-time worker group and a day-time worker group, or a part-time worker group and a full-time worker group.

Furthermore, in the above-noted embodiment, all the legitimate users have been previously registered in either the non-holder checkup list CLA or the no-card checkup list CLB. However, the present invention is not limited to this. A user who does not often visit a certain region may not be registered in a checkup order list CL of that region. This reduces the number of users registered in the checkup order lists CL. This improves efficiency.

Furthermore, in the above-noted embodiment, a checkup order list CL is selected in accordance with the type of a registrant and a regional group the acquisition device 2 belongs to. However, the present invention is not limited to this. A checkup order list CL may be selected in accordance with either the type of a registrant or a regional group the acquisition device 2 belongs to. The selection may take into consideration other factors.

Furthermore, in the above-noted embodiment, the physical trait information acquisition devices 3 (data input apparatuses) are divided into regional groups. However, the present invention is not limited to this. The acquisition devices 3 may be divided into groups in terms of the company's departments or business contents. Alternatively, each device 3 may belong to its unique group.

Furthermore, in the above-noted embodiments, the data ID is acquired from the IC card 4. However, the present invention is not limited to this. The acquisition device 3 may have an operation input section through which a user input a data ID. Both the operation input section and IC card 4 can be used. Instead of the IC card 4, a paper card on which a data ID is printed may be used.

If a user (verification-target user) inputs a data ID through the operation input section, he/she sometimes may input a wrong ID. Accordingly, If the verification-target user's blood vessel image data does not match with the registrant's blood vessel image data corresponding to the data ID, the control section 20 of the authentication device 2 determines that he/she is a card-non-holding verification-target user and then performs an authentication process by using the non-holder checkup list CLA. Accordingly, the authentication device 2 authenticates smoothly even when a user inputs a wrong data ID, and therefore he/she would not get frustrated.

Furthermore, in the above-noted embodiment, the authentication device 2 (a server) holds the registrants' blood vessel image data and the checkup order lists CL. However, the present invention is not limited to this. Each acquisition device 3 may have the registrants' blood vessel image data and the checkup order lists CL.

In this case, each acquisition device 3 stores: the registrants' blood vessel image data of all the legitimate registered users; and the checkup order lists CL it uses (for example, the headquarter TK's acquisition device 3Tb stores its non-holder checkup list CLAt and no-card checkup list CLBt).

The control section 10 of the acquisition device 3 performs an authentication process based on the procedure RT2. The control section 10 orders the acquisition devices 3 in its own regional groups and neighboring regional groups to update the checkup order. In this case, the system may not include the authentication device 2.

Instead, the acquisition device 3 may perform an authentication process based on the procedure RT2 and notify the authentication device 2 of the result of authentication. In this case, the authentication device 2 may order the acquisition devices 3 in its regional groups and neighboring regional groups to update the checkup order. The authentication device 2 may order the acquisition devices 3 in a regional group (to which the acquisition device 3 that notifies the authentication device of the result of authentication belongs) and its neighboring groups to update the checkup order.

Furthermore, in the above-noted embodiment, the above method is applied to the entering-and-leaving management system 1. However, the present invention is not limited to this. The above method can also be applied to other systems such as a network management system, which only allows a certain group of operators to access a network.

Furthermore, in the above-noted embodiment, physical identification information is data acquired from a blood vessel pattern of a user's finger. However, the present invention is not limited to this. The physical identification information can be image data or audio data acquired from various body parts such as fingerprints, lip's pattern, irises and voice pattern.

Furthermore, in the above-noted embodiment, the physical identification information is equivalent to registrant's identification data. However, the present invention is not limited to this. The registrant's identification data can be a user's unique information such as a code number or the like.

Furthermore, in the above-noted embodiment, the authentication apparatus 2 (a verification apparatus) includes the storage section 22; the control section 20, equivalent to a selection section; and the control section 20 and verification section 24, equivalent to a checkup section. However, the present invention is not limited to this. The verification apparatus may be configured in a different manner, including a storage section, a selection section and a verification section.

The above method can be applied to various authentication systems, such as a system which authenticates a user via a network and only allows a legitimate user to use it.

It should be understood by those skilled in the art that various modifications, combinations, sub-combinations and alterations may occur depending on design requirements and other factors insofar as they are within the scope of the appended claims or the equivalents thereof.

What is claimed is:

1. A verification apparatus for checking a verification-target data against registrant's identification data, comprising:

a storage section that stores a plurality of first checkup order data each of which defines an order of checking the verification-target data against a plurality of registrant's identification data that are divided in accordance with a predetermined condition into a plurality of first groups;

a selection section that selects one of the first checkup order data that is associated with a first group corresponding to the condition; and a checkup section that checks, in accordance with the selected first checkup order data, the verification-target data against a plurality of registrant's identification data in the first group corresponding to the condition; and wherein the condition is whether a storage medium storing a registration specification data that specifies one of the registrant's identification data has been delivered or not.

2. The verification apparatus according to claim 1, wherein:

the verification apparatus is connected via a network to a plurality of data input apparatuses to which the verification-target data is input, the data input apparatuses being divided into second groups;

the storage section stores second checkup order data that define an order of checking the verification-target data against all the registrant's identification data in each first group, the second checkup order data being associated with the plurality of second groups; and the selection section selects one of the second checkup order data that corresponds to a second group the data input apparatus to which the verification-target data was input belongs to.

3. The verification apparatus according to claim 1, wherein:

the verification apparatus is connected via a network to a plurality of data input apparatuses to which the verification-target data is input, the data input apparatuses being divided into second groups;

the storage section stores a plurality of checkup order groups each of which includes a plurality of first checkup order data, the checkup order groups being associated with the second groups; and the selection section selects one of the first checkup order data that corresponds to the first group from a checkup order group corresponding to the second group the data input apparatus to which the verification-target data was input belongs to.

4. The verification apparatus according to claim 1, wherein:

if the checkup section receives the registration specification data when receiving the verification-target data, the checkup section checks the verification-target data against the registrant's identification data specified by the registration specification data;

whereas if the checkup section does not receive the registration specification data when receiving the verification-target data, the checkup section checks, in accordance with the selected first checkup order data, the verification-target data against a plurality of registrant's identification data;

if the selection section recognizes, when receiving condition data indicating whether the storage medium has been delivered or not along with the verification-target data, from the condition data that the storage medium has not been delivered, the selection section selects one of the first checkup order data corresponding to a first group to which the storage medium has not been delivered; and whereas if the selection section recognizes from the condition data that the storage medium has been delivered even though the registration specification data has not been input, the selection section selects one of the first checkup order data corresponding to a first group to which the storage medium has been delivered.

5. The verification apparatus according to claim 3, wherein:

the data input apparatuses are divided into the second groups in accordance with regions where the data input apparatuses are placed;

if the checkup section receives the registration specification data when receiving the verification-target data, the checkup section checks the verification-target data against the registrant's identification data specified by the registration specification data;

whereas if the checkup section does not receive the registration specification data when receiving the verification-target data, the checkup section checks, in accordance with the selected first checkup order data, the verification-target data against a plurality of registrant's identification data;

if the selection section recognizes, when receiving condition data indicating whether the storage medium has been delivered or not along with the verification-target data, from the condition data that the storage medium has not been delivered, the selection section selects, from a checkup order group corresponding to the second group the data input apparatus to which the verification-target data was input belongs to, one of the first checkup order data corresponding to a first group to which the storage medium has not been delivered; and whereas if the selection section recognizes from the condition data that the storage medium has been delivered even though the registration specification data has not been input, the selection section selects, from a checkup order group corresponding to the second group the data input apparatus to which the verification-target data was input belongs to, one of the first checkup order data corresponding to a first group to which the storage medium has been delivered.

6. The verification apparatus according to claim 1, further comprising a checkup order update section that moves the registrant's identification data that has matched with the verification-target data up in the order of the selected checkup order data.

7. The verification apparatus according to claim 2, further comprising a checkup order update section that updates the checkup order data of a reference second group and the checkup order data of a second group whose closeness with the reference second group is high, the reference second group being a group the data input apparatus to which the verification-target data was input belongs to, wherein the checkup order update section moves the registrant's identification data that has matched with the verification-target data up in the order of the selected checkup order data and also moves the registrant's identification data that has matched with the verification-target data up in the order of the checkup order data corresponding to the second group whose closeness with the reference second group is high.

8. The verification apparatus according to claim 2, further comprising a checkup order update section that updates the checkup order data of a reference second group and the checkup order data of a second group whose closeness with the reference second group is high, the reference second group being a group the data input apparatus to which the verification-target data was input belongs to, wherein the checkup order update section moves the registrant's identification data that has matched with the verification-target data up to the highest rank in the order of the selected checkup order data and also moves the registrant's identification data that has matched with the verification-target data up to the highest rank in the order of the checkup order data corresponding to the second group whose closeness with the reference second group is high.

9. The verification apparatus according to claim 2, further comprising a checkup order update section that updates the checkup order data of a reference second group and the checkup order data of a second group whose closeness with the reference second group is high, the reference second group being a group the data input apparatus to which the verification-target data was input belongs to, wherein the checkup order update section moves the registrant's identification data that has matched with the verification-target data up in the order of the selected checkup order data and also moves the registrant's identification data that has matched with the verification-target data up a number of places determined by the closeness in the order of the checkup order data corresponding to the second group whose closeness with the reference second group is high.

10. A computer-implemented verification method for checking a verification-target data against registrant's identification data, comprising:

a selection step of selecting, from a plurality of first checkup order data each of which defines an order of checking the verification-target data against a plurality of registrant's identification data that are divided in accordance with a predetermined condition into a plurality of first groups, one of the first checkup order data that is associated with a first group corresponding to the condition; and a checkup step of checking, using at least a processor of the computer, in accordance with the selected first checkup order data, the verification-target data against a plurality of registrant's identification data in the first group corresponding to the condition; and wherein the condition is whether a storage medium storing a registration specification data that specifies one of the registrant's identification data has been delivered or not.

11. A non-transitory computer-readable storage medium storing a computer program which, when executed by a computer, performs a verification method for checking a verification-target data against registrant's identification data, the method comprising:

a selection step of selecting, from a plurality of first checkup order data each of which defines an order of checking the verification-target data against a plurality of registrant's identification data that are divided in accordance with a predetermined condition into a plurality of first groups, one of the first checkup order data that is associated with a first group corresponding to the condition; and a checkup step of checking, in accordance with the selected first checkup order data, the verification-target data against a plurality of registrant's identification data in the first group corresponding to the condition; and wherein the condition is whether a storage medium storing a registration specification data that specifies one of the registrant's identification data has been delivered or not.

* * * * *